US011350713B2

(12) United States Patent
Newman

(10) Patent No.: US 11,350,713 B2
(45) Date of Patent: Jun. 7, 2022

(54) COMBINATION LUGGAGE AND CHILD CARRIER

(71) Applicant: Travel Glider IP Pty Ltd as Trustee for Travel Glider IP Unit Trust, Sydney (AU)

(72) Inventor: Benjamin John Newman, St Kilda (AU)

(73) Assignee: Travel Glider IP Pty Ltd, Sydney (AU), as Trustee for Travel Glider IP Unit Trust ( * ) Notice: Subject to any disclaimer, the term of this patent is extended or adjusted under 35 U.S.C. 154(b) by 472 days.

(21) Appl. No.: 16/343,012

(22) PCT Filed: Oct. 18, 2017

(86) PCT No.: PCT/AU2017/000224
§ 371 (c)(1),
(2) Date: Apr. 18, 2019

(87) PCT Pub. No.: WO2018/071955
PCT Pub. Date: Apr. 26, 2018

(65) Prior Publication Data
US 2019/0328093 A1    Oct. 31, 2019

(30) Foreign Application Priority Data

Oct. 18, 2016    (AU) ................................ 2016904228

(51) Int. Cl.
*A45C 5/14*    (2006.01)
*B62B 3/02*    (2006.01)
(Continued)

(52) U.S. Cl.
CPC .................. *A45C 5/14* (2013.01); *B62B 3/02* (2013.01); *A45C 2005/037* (2013.01);
(Continued)

(58) Field of Classification Search
CPC ................ A45C 5/14; A45C 2005/037; A45C 2009/002; B62B 3/02; B62B 5/082; B62B 2205/04
See application file for complete search history.

(56) References Cited

U.S. PATENT DOCUMENTS 2,119,836 A * 6/1938 Waeles ...................... B62B 7/10
280/37
4,915,401 A    4/1990 Severson
(Continued)

FOREIGN PATENT DOCUMENTS

CN    201595312 U    10/2006
CN    201393652 Y    2/2010
(Continued)

OTHER PUBLICATIONS

Machine translation of WO2014135094A1 by Lexis Nexis Total Patent on Apr. 17, 2019 (pp. 40).
(Continued)

*Primary Examiner* — Tri M Mai
(74) *Attorney, Agent, or Firm* — Woodard, Emhardt, Henry, Reeves & Wagner, LLP

(57) ABSTRACT

The invention provides a luggage apparatus (10, 110) capable of being used in normal mode and alternately in child carrying mode. Luggage apparatus (10, 110) has a top (12, 112) a bottom (14, 114), a front (16, 116), a rear (18, 118) and opposing sides (20, 120) and (22, 122). The dimension between the front (16, 116) and the rear (18, 118) is longer than the dimension between the opposing sides (20, 120) and (22, 122). A first wheel means (24, 124) is located in the vicinity of the front (16, 116). The first wheel means (24, 124) is used to wheel luggage apparatus (10, 110) in normal mode. A second wheel means (28, 128) is located in the vicinity of the rear (18, 118) and, in conjunction with the first wheel means (24, 124), can be used to wheel the
(Continued)

luggage apparatus (10, 110) in child carrying mode. A child seat (44, 144) is foldable within the luggage apparatus (10, 110) in normal mode and unfoldable in child carrying mode to be positioned on or above the top (12, 112) of the luggage apparatus (10, 110). In child carrying mode, the longer dimension is substantially parallel to the ground supporting the luggage apparatus (10, 110) and the unfolded child seat (44, 144) is positioned so that the centre of gravity of the child seat (44, 144) and any child thereon is substantially between the front (16, 116) and the rear (18, 118).

20 Claims, 12 Drawing Sheets

(51) Int. Cl.
　　*A45C 5/03*　　　(2006.01)
　　*A45C 9/00*　　　(2006.01)
　　*B62B 5/08*　　　(2006.01)

(52) U.S. Cl.
　　CPC ......... *A45C 2009/002* (2013.01); *B62B 5/082* (2013.01); *B62B 2205/04* (2013.01)

(56) References Cited

U.S. PATENT DOCUMENTS

| | | | |
|---|---|---|---|
| 5,738,410 A | 4/1998 | Stroud | |
| 6,341,817 B1* | 1/2002 | Stern-Gonzalez | A47C 3/16 297/188.09 |
| 6,851,700 B2 | 2/2005 | Yoshie | |
| 7,309,106 B2* | 12/2007 | Stallman | A47C 15/004 297/188.09 |
| 7,354,049 B2 | 4/2008 | Schmidt | |
| 2006/0175170 A1 | 8/2006 | Brown | |
| 2007/0089952 A1 | 4/2007 | Herbst | |
| 2010/0059970 A1 | 3/2010 | Scott | |
| 2010/0072012 A1 | 3/2010 | Malinowski | |

FOREIGN PATENT DOCUMENTS

| | | |
|---|---|---|
| CN | 104223685 A | 12/2014 |
| CN | 105077924 | 11/2015 |
| GB | 2429636 A | 3/2007 |
| WO | WO 2014/135094 A1 | 9/2014 |

OTHER PUBLICATIONS

Notification of Transmittal of International Preliminary Report on Patentability dated Feb. 18, 2019 in related PCT/AU2017/000224.
Written Opinion and International Search Report issued in related PCT/AU2017/000224 dated Dec. 21, 2017.
European Search Report issued in related EP17862365.8 dated Mar. 2, 2020.
Machine translation of CN201393652Y by PatentBase on Aug. 25, 2020.
Chinese Office Action issued in related Patent Application CN20178006463.1 dated Aug. 12, 2020.
English summary of Chinese Office Action issued in related Patent Application CN20178006463.1 dated Aug. 12, 2020.
Machine translation of CN104223685A by Patbase on Sep. 21, 2020.
Machine translation of CN105077924A by Patbase on Sep. 21, 2020.
Machine translation of CN201595312U by Patbase on Sep. 21, 2020.

* cited by examiner

COMBINATION LUGGAGE AND CHILD CARRIER

PRIORITY

Priority is claimed of Australia patent application No 2016904228, the contents of the disclosure in which are incorporated herein by reference.

FIELD

The present invention relates to a luggage apparatus capable of being used as a child carrier. In some embodiments, the invention provides a luggage apparatus which is light enough to qualify as cabin luggage or carry-on luggage for an aircraft but which is able to transport an infant or child outside the aircraft.

BACKGROUND

The following references to and descriptions of prior proposals or products are not intended to be, and are not to be construed as, statements or admissions of common general knowledge in the art. In particular, the following prior art discussion does not relate to what is commonly or well known by the person skilled in the art, but assists in the understanding of the inventive step of the present invention, of which the identification of pertinent prior art proposals is but one part.

It is well known that carers of infants and young children experience difficulties when travelling on aircraft. Usually there is a significant distance to walk between an airline check-in counter and the gate at which the designated aircraft departs. At the end of a flight, there is usually a significant distance to walk between the arrival gate and the luggage carousel or airport exit.

Travelers without young children may cope with these distances by using wheeled cabin baggage. However, travelers with young children may need to carry the children as well as pulling or pushing wheeled luggage. Especially in the case of a single traveler it can be very burdensome to transport the carry-on luggage and carry a child or infant.

A child stroller can be used, but child strollers are usually large and cumbersome. They typically do not fold down sufficiently to fit within carry-on flight luggage dimensions. Therefore child strollers are required to be transported in the hold as oversize luggage, in some situations adding to the cost of flying. They may also be damaged or soiled when stowed or transferred.

There have been attempts to address these difficulties. Some solutions involve a perch for the child on top of the luggage. In this type of solution, the luggage has a pair of wheels at its base for normal use and a second set of wheels which protrudes rearwardly when transporting a child, in order to maintain balance. Because the luggage has its longer dimension almost perpendicular to or angled towards the ground, when a child is riding on the luggage the child is high off the ground. The centre of gravity of the luggage is raised moved to the rear or beyond the rear of the luggage. There is a danger of the child falling off or the luggage tipping over. In addition, the rearwardly-projecting wheels can interfere with the traveler's stride when pushing the luggage and cause tripping.

Reference is made to U.S. Pat. No. 6,016,893, in which a suitcase has a fixed part and a swinging part. To transport a child, the swinging part is swung backwards so that a child may be carried on the fixed part. The centre of gravity of the suitcase in the child-carrying configuration is moved towards the rear of the suitcase. It is necessary to have wheels on a scissor-like support member protrude rearwardly, in order to help stabilize the structure, but the wheels can present a walking hazard. In addition, the swinging part must be secured to the handle to keep it in place. Further, the seating position for the child is high above the ground, and there is a danger that the child may fall off and injure itself or that the suitcase may topple over with the same result. Lastly, this suitcase is relatively large and would exceed the size permitted for use as cabin luggage.

Reference is also made to US 2017/0119117, in which a child seat is formed on top of a cabin bag which is then tilted backwards to provide an incline on the child seat. Once again, the centre of gravity of the cabin bag in the child-carrying configuration is moved to or beyond the rear of the suitcase. Once again, it is necessary to have wheels on a scissor-like support member protrude rearwardly, in order to help stabilize the structure, but the wheels can present a walking hazard. In addition, the seating position for the child is high above the ground, and there is a danger that the child may fall off and injure itself or that the cabin bag may topple over with the same result.

Some solutions reduce the storage capacity of the luggage. However, travelling with children or infants involves the transport of baby supplies which may be needed in flight, so adequate luggage storage is required.

The prior art does not cater for the carriage of infants, who need to be transported in a reclining position for the infant's safety, preferably at an angle of less than 40 degrees to the horizontal. Further, the prior art does not provide a luggage apparatus versatile enough to transport an infant at first and later the growing child.

There is a need for a luggage apparatus, versatile enough to carry an infant or a growing child, which is stable and which still has adequate room for storage. There is also a need for such luggage that is small enough and light enough to qualify as cabin baggage. There is further a need for such luggage to have the ability to carry an infant or young child so that a user may face the infant or young child if desired.

It is an object of the present invention to provide a luggage apparatus which fulfils the some or all of the above needs at least to an extent or which provides a useful alternative.

SUMMARY OF INVENTION

Accordingly, the invention provides a luggage apparatus capable of being used in normal mode and alternately in child carrying mode, the luggage apparatus including:
  a top, a bottom, a front, a rear and opposing sides, the dimension between the front and the rear being longer than the dimension between the opposing sides;
  a first wheel means located in the vicinity of the front and adapted to enable wheeling of the luggage apparatus in normal mode;
  a second wheel means located in the vicinity of the rear and, in conjunction with the first wheel means, adapted to enable wheeling of the luggage apparatus in child carrying mode; and
  a child seat which is foldable within the luggage apparatus in normal mode and unfoldable in child carrying mode to be positioned on or above the top of the luggage apparatus;
wherein, in child carrying mode, the longer dimension is substantially parallel to the ground supporting the luggage apparatus and the unfolded child seat is positioned so that the centre of gravity of the child seat and any child thereon is substantially between the front and the rear.

It is preferred that the luggage apparatus of the invention has a handle, which may be extendable in either or both the normal mode and the child carrying mode. Optionally, the handle may be storable against the top or sides of the luggage apparatus. The handle may be detachable. Preferably the handle is mounted towards the rear of the luggage apparatus, in proximity to the second wheel means.

The handle is preferably located on the outside of the luggage apparatus of the invention. In the embodiments described below in connection with the drawings, the handle lies parallel to the top of the apparatus. However, it is within the scope of the invention that the handle is configured differently, including that the handle is at an oblique angle to the top.

In an embodiment, the child seat is independent of the handle. This can be advantageous, because the handle may be used in different configurations, being able to push the luggage apparatus from the front or from the rear in child carrying mode. When transporting an infant, it is often desirable for the carer to be facing the infant. An embodiment of the invention in which the luggage apparatus can be pushed from the front enables this. A further advantage of having the handle independent of the child seat is that it can be easier to allow for variable angles of the seat and the handle position.

Yet a further advantage of having the child seat independent of the handle is the ability to use the luggage apparatus as a child seat when not travelling, since the handle may be left in its stowed position while the child seat may be used in a stationary position, for example, for feeding the child or infant.

In another embodiment, the child seat is connectable to the handle.

In an embodiment, the luggage apparatus is configured so that the child faces away from the carer in child carrying mode.

The luggage apparatus of the invention may have the top, bottom, front, rear and sides made of any suitable material or combination of materials, including woven or non-woven fabric or hard shell panels or moulding.

Preferably, when in normal mode, the luggage apparatus of the invention may be sized and weighted to qualify as cabin baggage for most airlines. Most airlines will accept as cabin baggage a bag having linear dimensions totaling 115 cm, for example made up of 40 cm×50 cm×25 cm, or 36 cm×56 cm×23 cm. The weight should not exceed 7 kg. If it is necessary, the child seat may be detachable from the luggage apparatus to keep under the weight limit.

The first wheel means may be a single wheel or a plurality of wheels. It is preferred that there are two wheels, spaced apart at the front of the luggage apparatus and located close to the bottom of the luggage apparatus when in child carrying mode. While the first wheel means may be swiveling or castor wheels, it is preferred that they are fixed wheels aligned with the opposing sides of the luggage apparatus.

The second wheel means may be a single wheel or a plurality of wheels. It is preferred that there are two wheels, spaced apart at the rear of the luggage apparatus when in child carrying mode. It Is especially preferred that the second wheel means are castor wheels and that these are lockable in two ways, first so as to limit them to forward and rearward travel only and secondly for braking.

In one embodiment, the second wheel means are designed to retract or fold against or within the bottom of the luggage apparatus when in normal mode. For this purpose, the second wheel means may be mounted on pivot joints or similar.

In the embodiment which includes a handle, the handle may be connected to a mechanism which causes the second wheel means to extend or unfold when the handle is placed in a position suitable for use in child carrying mode.

The foldable child seat for use with the apparatus of the invention may take any suitable form. Preferably, the child seat is capable of use for an infant in an appropriately reclined position and for an older child, when in a less reclined position.

It is preferred that the foldable child seat includes a harness to ensure that the infant or child is retained in place when the luggage apparatus is used in child carrying mode. The harness may be attached to the child seat as required. The harness may be similar to a four or five point harness used with child safety restraints for vehicles. Other harnesses are within the scope of this option of the invention.

The child seat may be foldable in any suitable way. Some examples are set out below and described in the accompanying drawings. It is preferred that the child seat, once folded, is stowed in the luggage apparatus. In a preferred embodiment, the folded child seat is stored in a first compartment close to the top of the luggage apparatus. The first compartment may have a closure such as a lid which forms the top of the luggage apparatus in the normal mode. The lid may be joined to the luggage apparatus by a hinge, one or more latches, a sliding clasp fastener, a combination of two or more of these or other suitable arrangement.

It is preferred that the folded seat is configured so that the first compartment in which it is stowed is relatively shallow and that the remainder of the space within the luggage apparatus includes a second compartment available for storage. If desired, the second compartment may include a fixed or movable panel to separate the first compartment from the second compartment.

The foldable child seat may be permanently attached to the luggage apparatus or it may be removable. If the child seat is removed, the luggage apparatus may be used as conventional luggage. If the total weight of the luggage apparatus and the child seat exceeds an airline's allowance for cabin baggage, the child seat may be removed so that the luggage apparatus complies. In this instance, the child seat may be stored separately in the aircraft locker.

The foldable child seat may be formed with two or more parts which can fold relatively to each other, so as to fit within the first compartment when folded. In one example, the child seat may have a seating portion, a lower backrest portion and an upper backrest portion. A frame may support the lower and upper backrest portions in the unfolded configuration, locking into place. To fold the child seat, the lock is released, the seating portion is folded inwardly towards the lower backrest portion and the upper backrest is folded forwardly towards the lower backrest portion, resulting in a compact unit which can be stowed in the first compartment (if present). The procedure is reversed to unfold the child seat.

The backrest may be extendable for older children, for example by including telescoping elements in the frame.

In child carrying mode, the child seat may be attachable to a closure for the luggage apparatus. The child seat may be attachable to the handle.

The child seat may have suitable covering and cushioning for the comfort of the infant or child.

If it is desired to reduce weight of the child seat, padding may be minimized. Instead, it is within the scope of the invention to use a lightweight, breathable material of sufficient structural strength, such as the materials used in strollers, especially foldable strollers.

It is also within the scope of the invention to use a method of adjusting the angle of recline for a child in the child seat, by adjusting the angle of the backrest, as currently used in some strollers. The advantages can include reduction in weight, less parts and a simpler recline adjustment system.

BRIEF DESCRIPTION OF DRAWINGS

Preferred embodiments of the present invention will now be described, by way of examples only, with reference to the accompanying drawings, in which.

DESCRIPTION OF EMBODIMENTS

It will be appreciated that not all the drawings are of the same scale.

Figure 1:
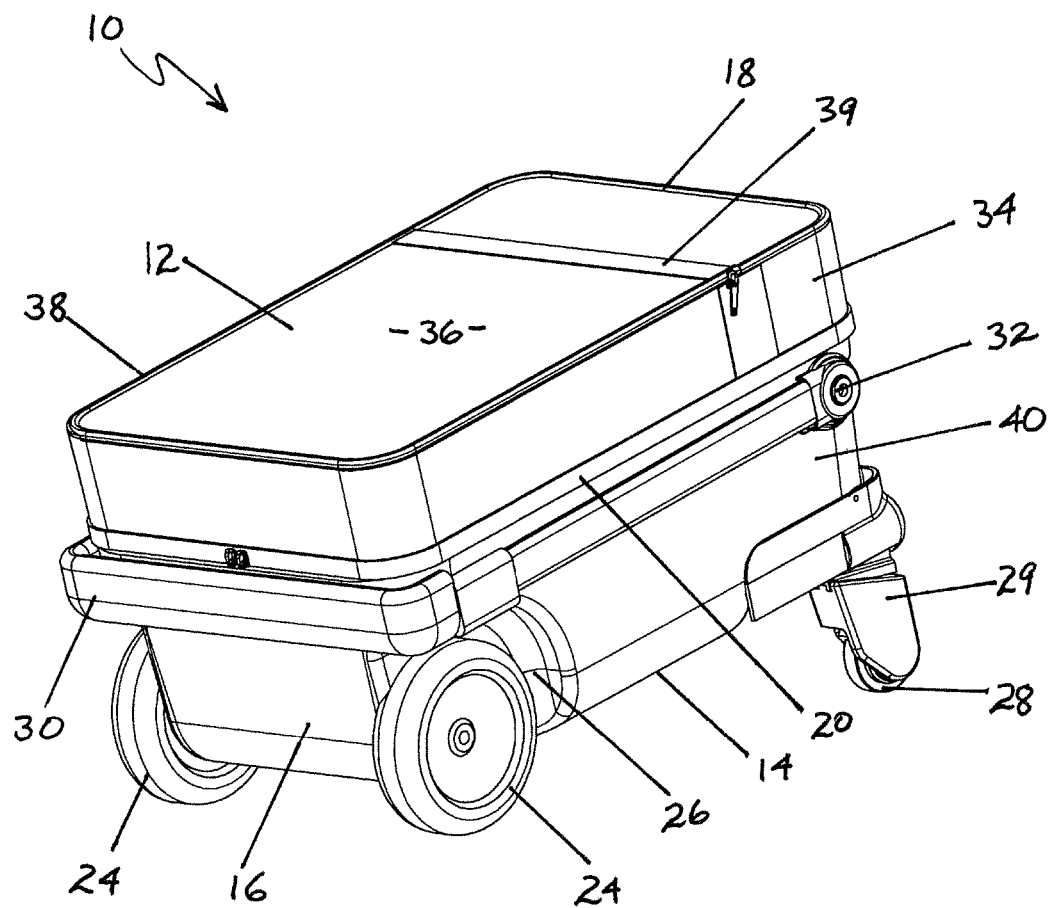
FIG. 1 shows a front perspective view of an embodiment of the luggage apparatus of the invention with the child seat folded away.
Figure 2:
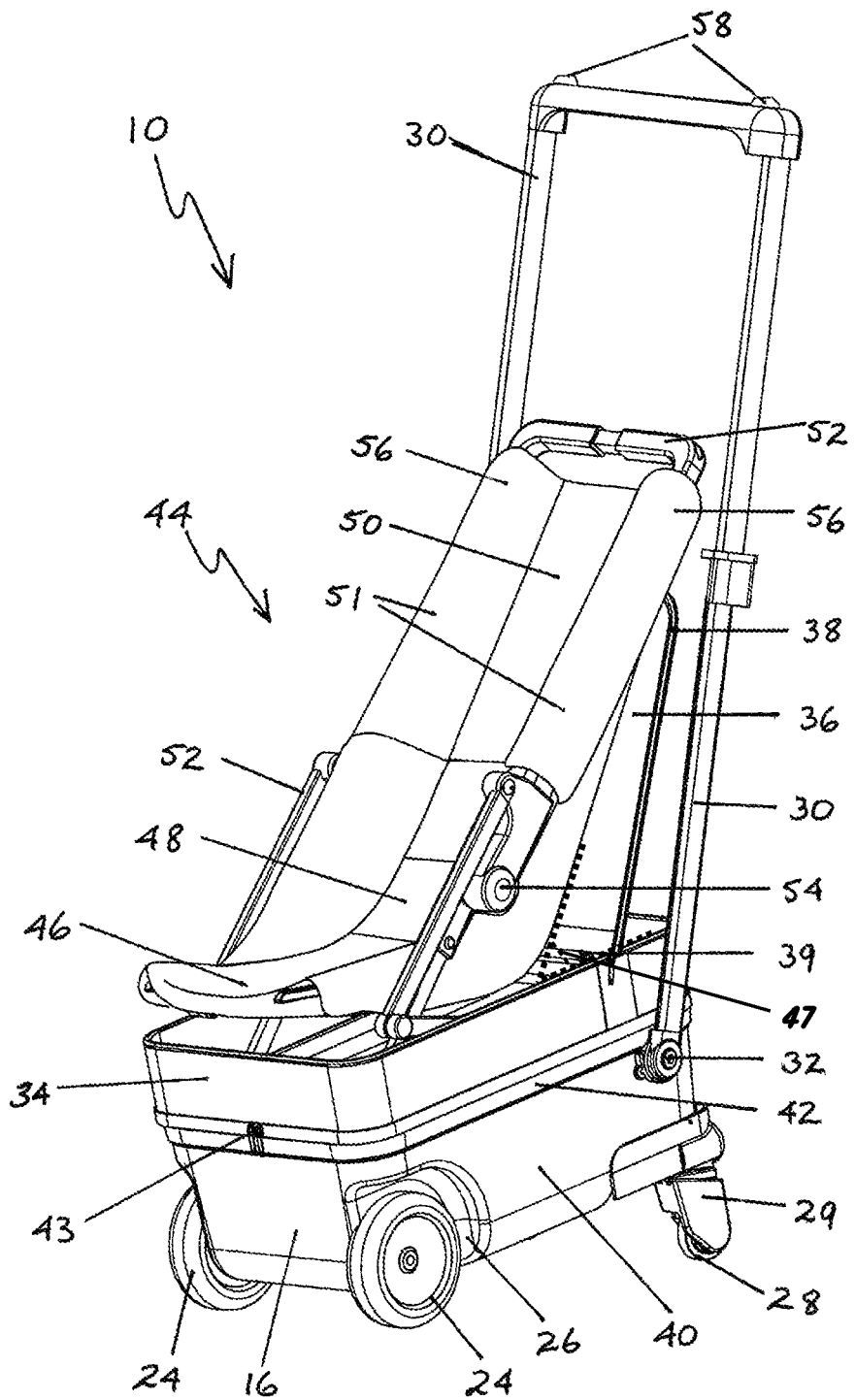
FIG. 2 shows the embodiment of FIG. 1 after the child seat has been unfolded ready for use.

Referring first to FIGS. 1 and 2, luggage apparatus 10 has a top 12, a bottom 14, a front 16, a rear 18 and opposing sides 20 and 22. The distance between front 16 and rear 18 is longer than the distance between opposing sides 20 and 22.

First wheels 24 are means located at front 16, in recesses 26, only one of which is visible in FIGS. 1 and 2. Wheels 24 are aligned with opposing sides 20 and 22 and are used to enable wheeling of luggage apparatus 10 in normal mode, when luggage apparatus 10 is transported with front 16 being closest to the ground.

Second wheels 28 in wheel assembly 29 are located at each side of rear 18 and are swiveling castor wheels for easy maneuvering.

Alternately, the positioning of the first wheels 24 and the second wheels 28 can be reversed so that the first wheels 24 are at the rear 18 and the second wheels 28 at the front 16.

Handle 30 in this embodiment pivots at pivot point 32 to lie around opposing sides 20 and 22 and front 16 when luggage 10 is in the normal mode. Handle 30 may be used to pull or push luggage apparatus 10 in the normal mode, by pivoting handle 30 at pivot point 32. Handle 30 can be extended or contracted telescopically. In FIG. 2, handle 30 is shown extended in child carrying mode. For use in normal mode, handle 30 may be used without extension or contraction after having been pivoted at pivot point 32, or if desired handle 30 may be adjusted for length to suit the user, by extending it or contracting it as desired.

As an alternate arrangement to that described above, handle 30 may be configured to slide along (or within) a track formed between front 16 and rear 18, and then may have a pivot action to locate it into the child carrying position as shown in FIG. 2.

Handle 30 also has buttons 58 for release of second wheel means as described later below.

In this embodiment, luggage apparatus 10 has a first compartment 34 having a closure 36, attached to luggage apparatus 10 by a sliding clasp fastener 38. Closure 36 may be completely detachable, if sliding clasp fastener surrounds closure 36. However, the embodiment as shown in FIG. 2 has a hinge 39 attaching closure 36 to luggage apparatus 10.

Luggage apparatus 10 also has a second compartment 40, which is separated from first compartment 34 by a fixed or movable panel 42 (FIG. 2). Panel 42 is shown attached to luggage apparatus 10 by a sliding clasp fastener 43.

Child seat 44 is stowed in first compartment 34 when luggage apparatus 10 is used in normal mode. Child seat 44 is mounted on panel 42 and may be fixed to panel 42 or detachable from panel 42. Alternately, child seat 44 may be fixed to or detachable from first compartment 34.

Alternately, child seat 44 may be mounted, either fixed or detachably, on the sides of first compartment 34.

Child seat 44 is designed so that when folded, as described below in more detail, it is contained within first compartment 34. Second compartment 40 is available for use to store other items as desired, such as diapers, clothing, baby bottles, etc.

Child seat 44 has seating portion 46, lower backrest portion 48 and upper backrest portion 50. Side panels 51 help to retain a child (not shown) in child seat 44. Part of frame 52 supports lower and upper backrest portions 48, 50 in the unfolded configuration shown in FIG. 2, where frame 52 has been unfolded at pivot points 54, and locked into place. As shown in FIG. 2, in the unfolded configuration, lower and upper backrest portions 48, 50 are angled by angle 47 relative to the top of compartment 34. Angle 47 is the recline angle of the backrest.

To fold child seat 44, the locks are released, seating portion 46 is folded inwardly towards lower backrest portion 48 and upper backrest portion 50 is folded forwardly towards lower backrest portion 48. Frame 52 is folded around pivot points 52, resulting in a compact unit which can be stowed in first compartment 34. The procedure is reversed to unfold child seat 44.

In FIG. 2, upper backrest portion 50 is shown in an extended configuration for use by an older child, by making use of telescoping elements (not shown) in frame 52.

Child seat 44 has a cushioned covering 56 which covers seat portion 46, lower and upper backrest portions 48, 50 and side panels 51.

It will be noted that child seat 44 is located on luggage apparatus 10 with its longer dimension approximately parallel to the ground. In this configuration, luggage apparatus 10 has increased stability, compared to prior art where the luggage has its longer dimension almost perpendicular to or angled towards the ground.

Wheels 28 do not protrude to any significant extent beyond rear 18 and do not represent a tripping hazard.

Further, child seat 44 is low to the ground and positioned on luggage apparatus 10 so that the centre of gravity of child seat 44 and any child thereon is substantially between front 16 and rear 18 (labeled in FIG. 1). Child seat 44 is stably supported on wheels 24 and 28.

In this embodiment, child seat 44 is supported by frame 52 and is not supported by or attached to handle 30. Handle 30 may be adjusted as to height and angle to suit tall or short travelers, without interfering with child seat 44 or its recline angle. If desired, a further supporting means (not shown) may be adjustably connected to frame 52 on either side to provide additional support to child seat 44.

Since child seat 44 can be folded into a neat unit stowable within first compartment 34, there is plenty of room for storage in second compartment 40.

Although the first embodiment described above (and the second embodiment described below) show the child seat facing front 16, it is within the scope of the invention that the child seat may be positioned to face the rear 18 so that the infant or child is in full view of the carer. Alternately, as shown in the embodiment in FIG. 6 described below, the infant or child may face the carer by adjusting configuration of the handle.

Access to second compartment 40 when luggage apparatus is in child carrying mode may be provided as required. For example, a flap closable by a sliding clasp fastener may be located in second compartment 40 at front 16 or side 20, or side 22 (not visible).

Turning now to the second embodiment in FIGS. 3 to 7, luggage apparatus 110 has hard shell panels and has a top 112, a bottom 114, a front 116, a rear 118 and side 120. The opposing side to side 120 is not visible in the Figures but is parallel to side 120. For convenience below, the opposing side will be referred to as side 122, although not labelled in the Figures. The distance between front 116 and rear 118 is longer than the distance between opposing sides 120 and 122.

First wheels means 124 are located at front 116, in recesses 126, only one of which is visible in FIGS. 3 to 6. Wheels 124 are aligned with opposing sides 120 and 122 and are used to enable wheeling of luggage apparatus 110 in normal mode, when luggage apparatus 110 is transported with front 116 being closest to the ground.

Second wheels 128 in wheel assembly 129 are located at each side of rear 118 and are swiveling castor wheels, as in the first embodiment.

Handle 130 pivots at pivot points 132 to lie around opposing sides 120 and 122 and front 116 when luggage 110 is in the normal mode and is to be carried. Alternately, handle 130 may be used to pull or push luggage apparatus 110 in the normal mode, by pivoting handle 130 at pivot points 132. Handle 130 can be extended or contracted telescopically. In FIGS. 3 to 7, handle 30 is shown, unextended, in child carrying mode.

In this embodiment, luggage apparatus 110 has a first compartment formed between closure 136 and support 137. Closure 136 extends the length of luggage apparatus 110, between front 116 and rear 118 and has a hinge (not shown) attaching closure 136 to luggage apparatus 110 at rear 118. Closure 136 can be latched at front 116 and/or at sides 120, 122 in the desired manner, when luggage apparatus 110 is used in normal mode.

Luggage apparatus 110 also has a second compartment 140, which is separated from first compartment 134 by a fixed or movable panel 142.

Child seat 144 is stowed in the first compartment when luggage apparatus 110 is used in normal mode. Child seat 144 is mounted within the first compartment and may be fixed in place or detachable.

Figure 4:
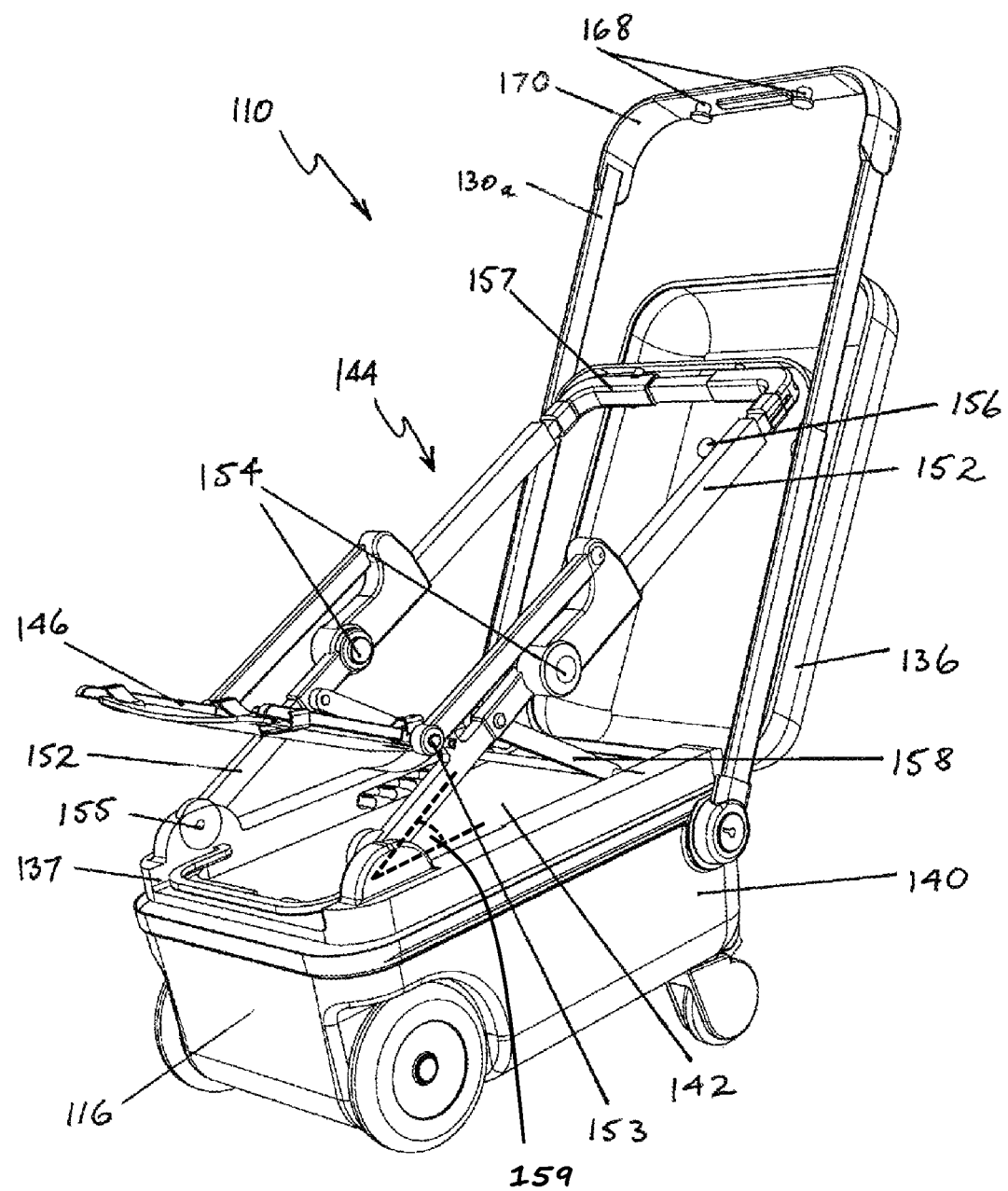
FIG. 4 shows the FIG. 3 embodiment after the child seat has been unfolded for use with an infant.

Child seat 144 has seating portion 146 which opens by pivoting at pivot points 153 (see FIG. 4, for example). Frame 152 pivots to unfold at pivot points 154 and 155. Angle 159 is the angle between frame 152 and the top of compartment 34. Once frame 152 is unfolded as shown in FIGS. 4 to 7, seating portion 146 and frame 152 may be locked into place in any desired manner with frame 152 positioned at various angles 159.

Figure 3:
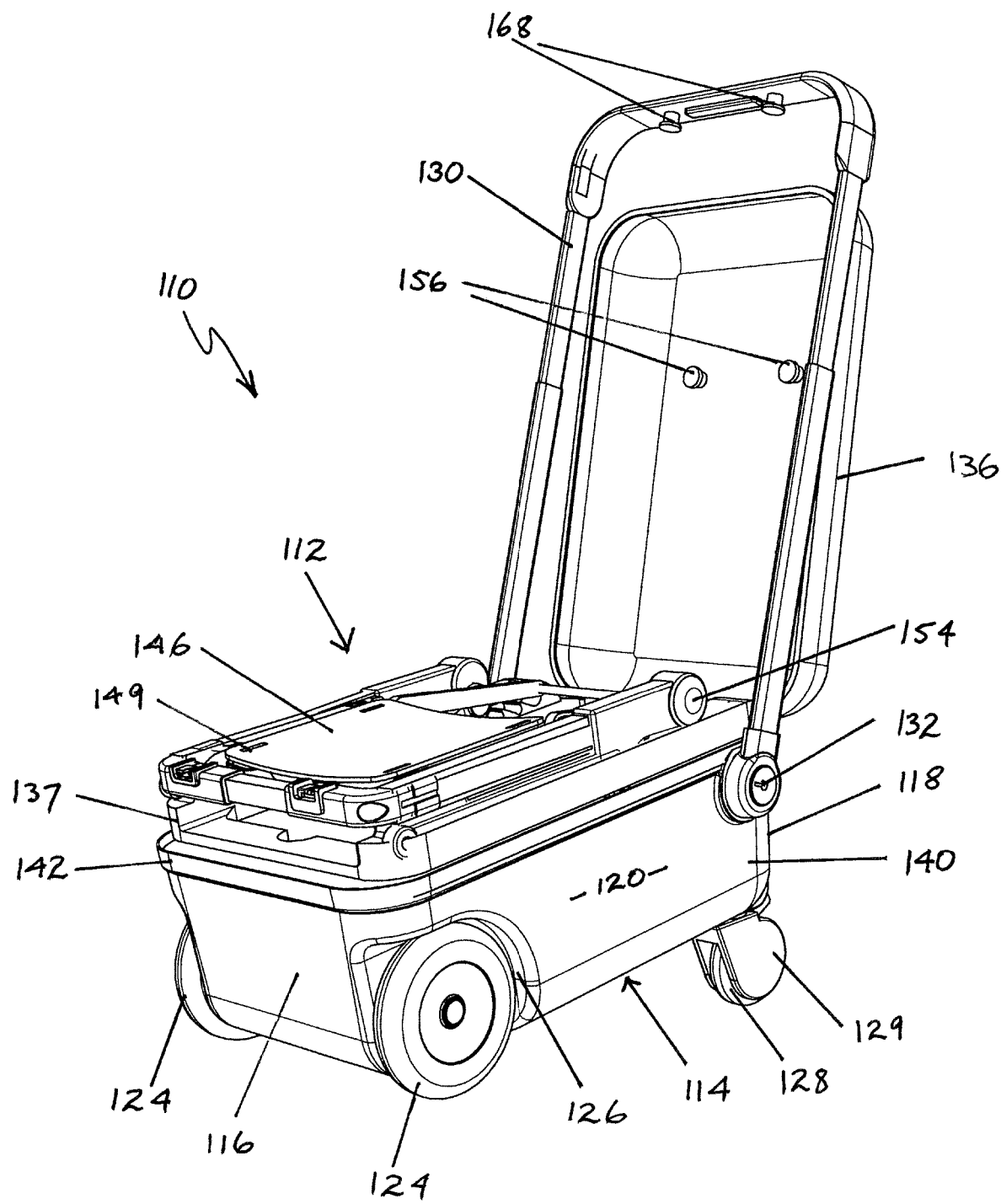
FIG. 3 shows a front perspective view of a second embodiment of the luggage apparatus of the invention, with a top lid of the luggage apparatus opened to expose the folded child seat.
Figure 6:
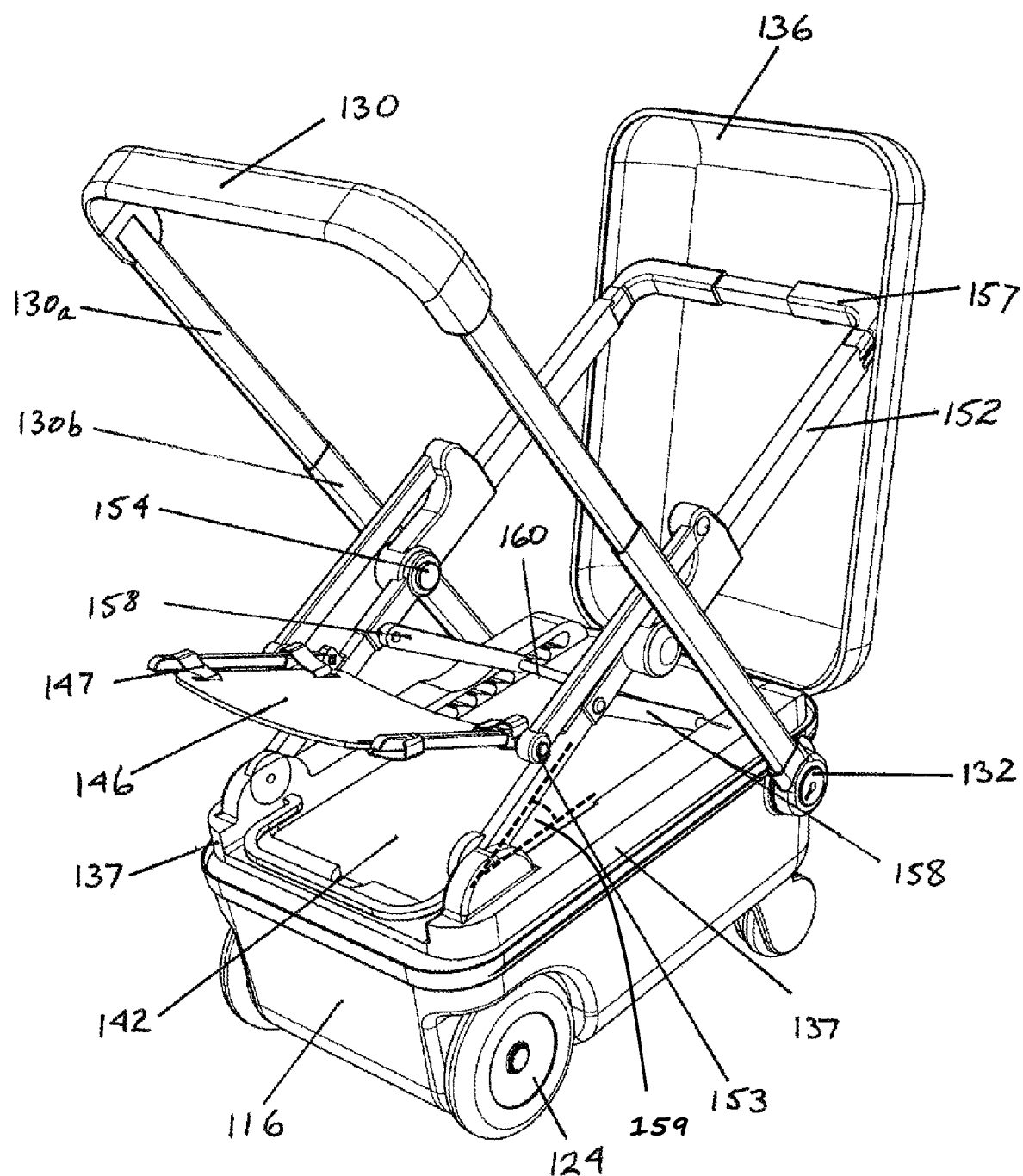
FIG. 6 is a view similar to that in FIG. 5, except that the handle of the luggage apparatus is adjusted so that user faces a child in the child seat and the recline angle of the child seat has been increased.

Seating portion 146 is connected to the relevant part of frame 152 by four webbing straps 147 (one is labelled in FIG. 6). Each webbing strap 147 passes through a slot 149, one of which is labelled in FIG. 3. In FIG. 3, webbing straps 147 have been omitted for the purpose of illustration of slots 149.

Figure 5:
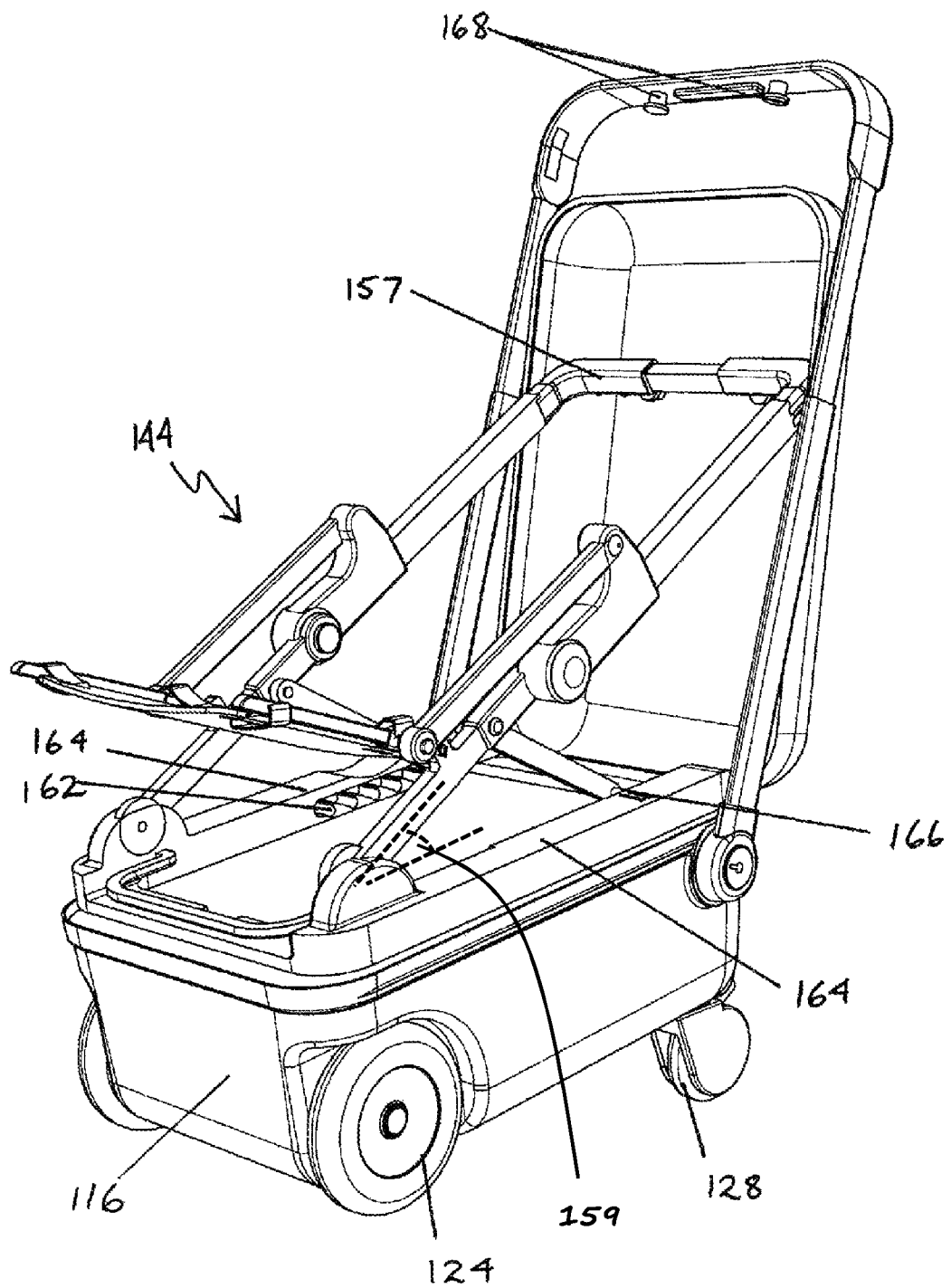
FIG. 5 shows the FIG. 4 embodiment after the child seat has engaged with the top lid of the luggage apparatus.
Figure 7:
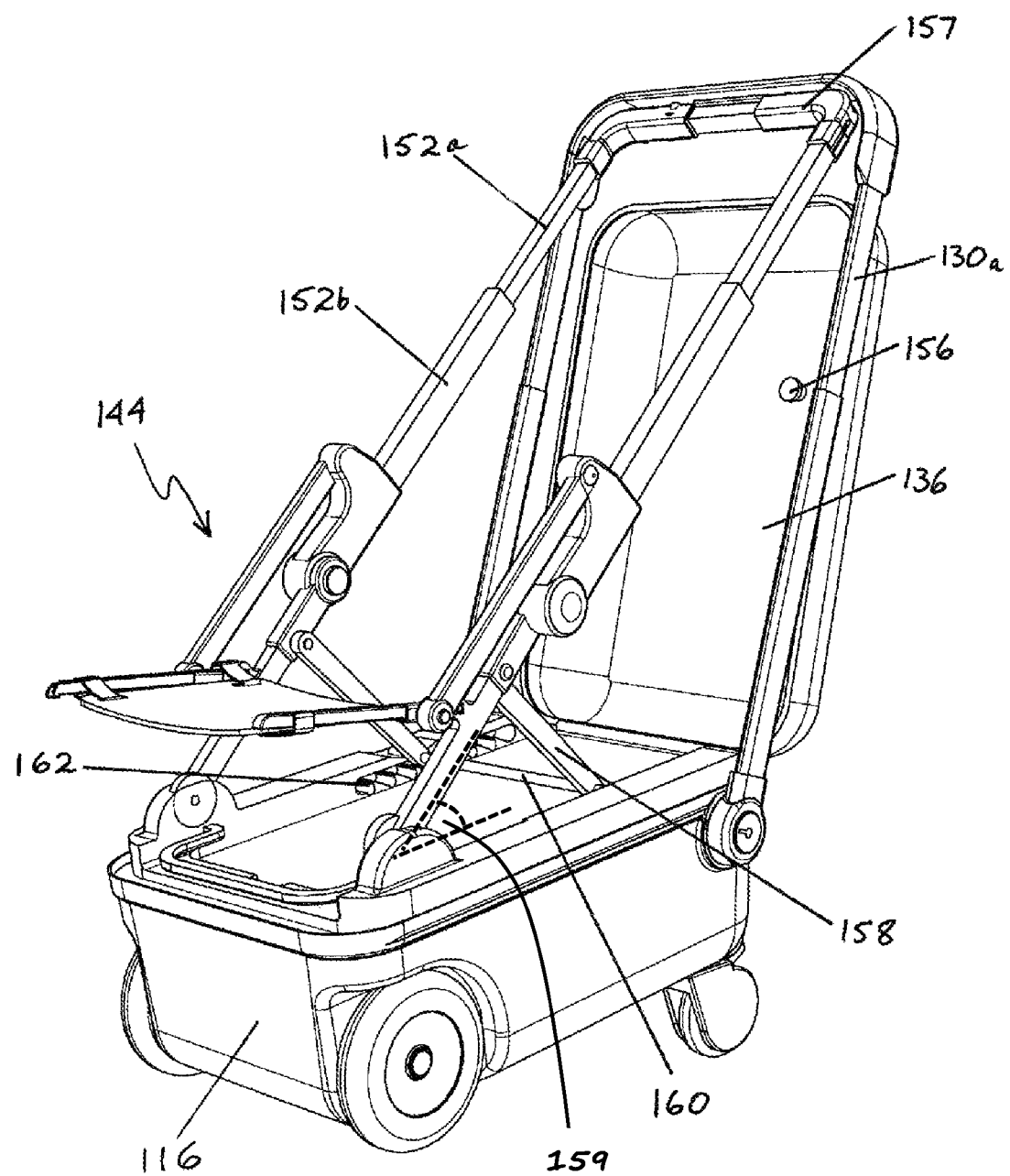
FIG. 7 shows the FIG. 3 embodiment after the child seat has been unfolded for use with an older child.

Frame 152 has supports 158 for adjustment of the recline angle of child seat 144 and to assist stability. With particular reference to FIGS. 5 and 7, supports 158 are connected by crossbar 160 to form an adjustment lever which may be engaged with any one of a series of notches 162 (only one of which is labelled). Notches 162 are contained within support structures 164, one located on either side of the first compartment (refer FIG. 5). Each notch 162 may have an upper opening 166 (one only is shown and labelled in FIG. 5) to receive a projection of crossbar 160.

In FIGS. 4 and 5, crossbar 160 is located in notches 162 located closest to rear 118. In FIG. 6, crossbar 160 is located in notches 162 spaced two notches away from those used in FIGS. 4 and 5, while in FIG. 7 crossbar 160 is located in notches 162 closer to front 116.

Closure 136 has protrusions 156 (see FIG. 3, for example,) designed to engage reciprocal notches or cavities (not shown) on the horizontal part 157 of frame 152 when child seat 144 is used to carry an infant, as shown in FIGS. 4 to 6. In FIG. 4, horizontal part 157 is shown prior to engagement with protrusions 136. FIGS. 5 and 6 show horizontal part 157 fully engaged with protrusions 156.

FIG. 6 provides an illustration of adjustment of handle 130 so that a user or carer may push luggage apparatus 110 while facing an infant or child in child seat 144. (The first embodiment in FIGS. 1 and 2 may be used in this configuration also.) Handle 130 is pivoted about pivot points 132 to the desired angle, then locked into place in known manner. Handle 130 can be extended to the desired height since upper part 130a can slide within lower part 130b in known manner.

In the embodiments in FIGS. 3 to 6, child seat 144 is independent of handle 130. The FIG. 7 embodiment has child seat 144 connectable to handle 130.

In FIG. 7, frame 152 has been extended as shown to accommodate an older, taller child, by extending part 152a out of part 152b in known manner. In this configuration, horizontal part 157 of frame 152 cannot engage protrusions 156 of closure 136. In order to secure the horizontal part of handle 130 to horizontal part 157 of frame 152, handle 130 has two protrusions 168 (FIGS. 3 to 5). Protrusions 168 are designed to engage reciprocal notches or cavities (not shown) on the horizontal part 157 of frame 152 when child seat 144 is used to carry an older child, as shown in FIG. 7. In FIG. 4, horizontal part 157 is shown fully engaged with protrusions 168.

Although not illustrated in FIG. 7, it is possible to provide even more flexibility with regard to the angle and/or height of handle 130 when luggage apparatus 110 is used to transport an older child. Because frame 152 is narrower than handle 130, handle 130 may carry a crossbar slidable along upper part 130a of handle 130. Such a crossbar 170 is included in FIG. 4 and can slide along upper part 130a of handle 130. Crossbar 170 has protrusions to engage with reciprocal notches or cavities (not shown) on the horizontal part 157 of frame 152.

When handle 130 is fully collapsed, crossbar 170 sits in a recess in the horizontal part of handle 130 and add strength to the handle.

In a reverse configuration, the engaging protrusions may be on the horizontal part 157 of frame 152 and the protrusions on the handle 130 or the crossbar.

For clarity, FIGS. 3 to 7 do not show the cushioned cover for child seat 144. The cushioned cover, which may resemble that in the first embodiment, covers the parts of frame 152 which would otherwise contact an infant of child in child seat 144. The cover also provides in sling form the backrest for the infant or child.

To fold child seat 144, seating portion 146 is unlocked and allowed to pivot freely at pivot points 153. Frame 152 is also unlocked and folded at pivot points 154, so that child seat 144 assumes the position shown in FIG. 3.

It will be appreciated by the person skilled in the art that the configuration of luggage apparatus 110 in FIGS. 4 and 5 is suitable for transport of an infant. The cushioned cover (not shown) has a sling type backrest so that an infant in child seat 144 is carried at a suitable inclination—in this case, at an angle of 40 degrees or less to the ground.

It will also be appreciated by person skilled in the art that regardless of the position of handle 130—used from rear 118 in FIGS. 4, 5 and 7 or from front 116 in FIG. 6, the is no significant projection of wheels 124 or 128 beyond the footprint of luggage apparatus 110, thus reducing likelihood of tripping.

In all embodiments in FIGS. 4 to 7, unfolded child seat 144 is positioned so that the centre of gravity of child seat 144 and any child thereon is substantially between front 116 and rear 118.

Instead of adjusting the angle of recline of child seat 144 as shown in FIGS. 4 to 7, supports 158, crossbar 160, support structures 164 and notches 162 may be replaced by a backrest such as the backrest used in recline-adjustable strollers. The backrest is made of suitably lightweight but strong fabric attached to a frame such as frame 152. The backrest fabric is attached by side panels to the frame. In a reclining position, the backrest is approximately parallel to the frame. To reduce the recline angle, the top part of the backrest is drawn inwardly towards the frame, for example by using a webbing recline strap or similar means. The backrest then is no longer parallel to the frame but converges towards it at the top of the backrest.

Figure 8A:
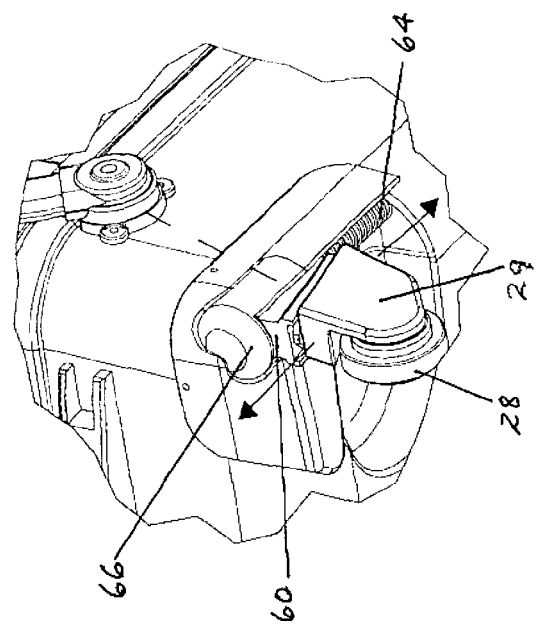
FIG. 8A illustrates a detail of the rear castor wheel pivot and lock mechanism circled in FIG. 8.
Figure 8:
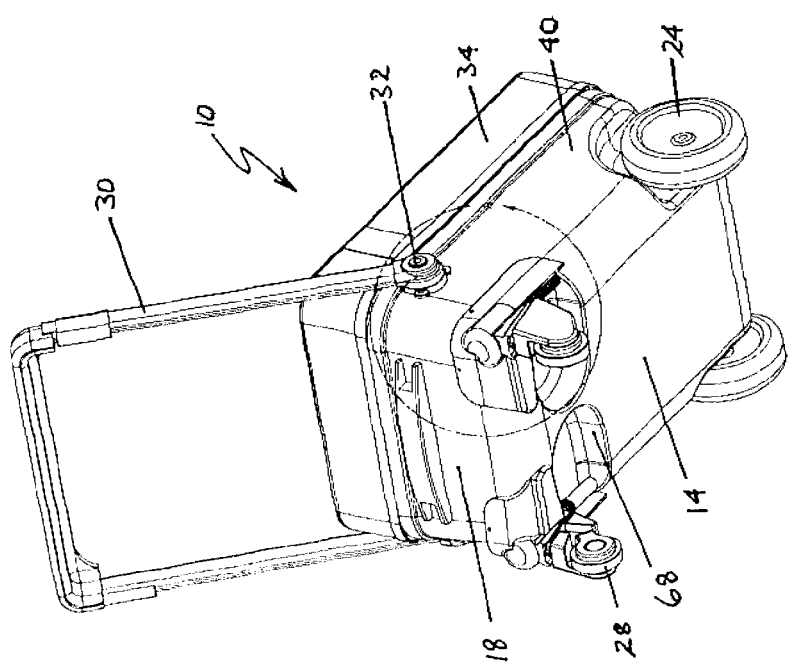
FIG. 8 shows the embodiments of FIGS. 1 and 2 from beneath.
Figure 9:
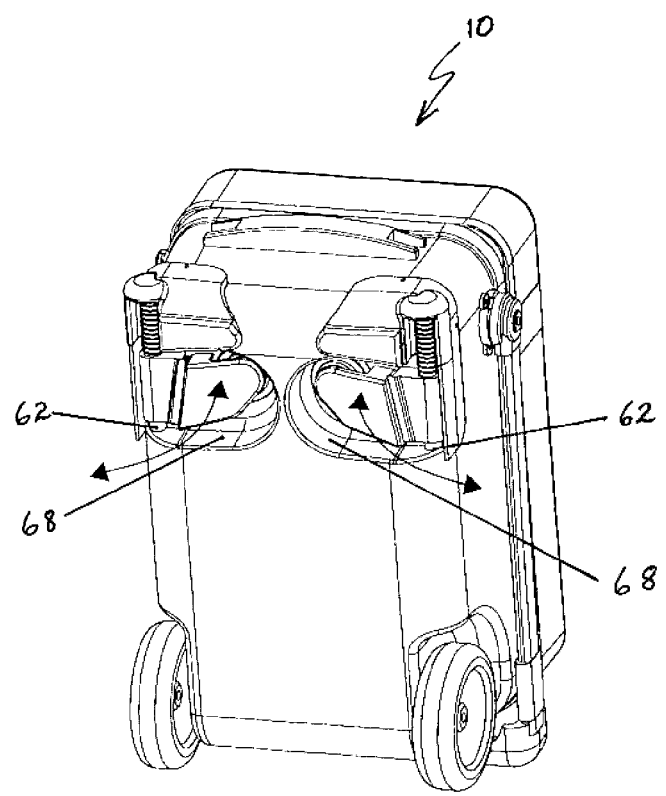
FIG. 9 is a view from beneath, after the rear wheels have been pivoted into the body of the luggage apparatus and the handle stowed.

Reference is now made to FIGS. 8, 8a and 9. FIGS. 8 and 9 shows the embodiments of FIGS. 1 and 2 from beneath, while FIG. 8a shows a detail of the rear castor wheel pivot and lock mechanism circled in FIG. 8. The views in FIGS. 8, 8a and 9 are also applicable to the embodiments in FIGS. 3 to 7, but for convenience, the labels of FIGS. 1 and 2 will be used for FIGS. 8, 8a and 9.

Castor wheels 28 are mounted in wheel assembly 29. Pivot joint 60 is mounted on axle 62. Pivot joint 60 is slidable along axle 62. Spring 64 may be mounted on axle 62 in front of pivot joint 60, as shown in FIGS. 8 and 8a, or behind pivot joint 60, as shown in FIG. 9. Spring 64 is rotationally biased to retract wheel assemblies 29.

For use in child carrying mode, pivot joints 60 are locked into the configuration shown in FIGS. 8 and 8a by notched sections 66. For normal mode, pivot joints 60 and hence wheel assemblies 29 are pivoted into recesses 68, as shown by the arrows in FIG. 9.

Figure 11:
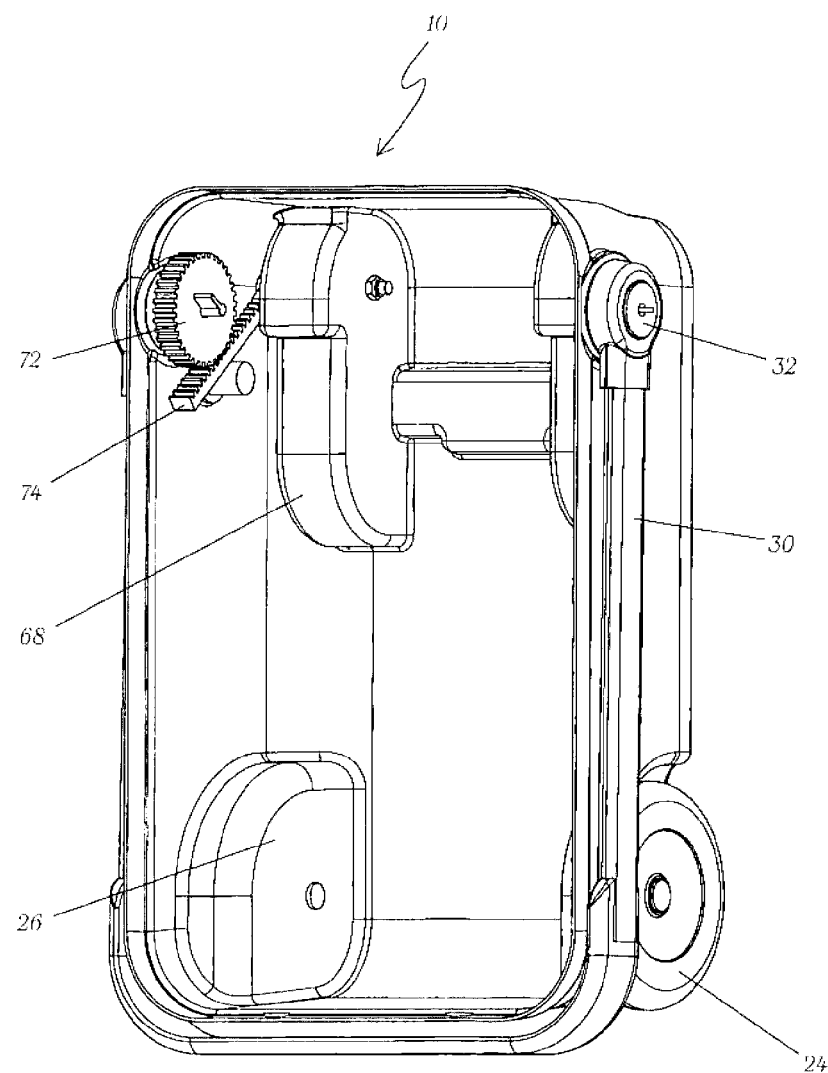
FIG. 11 is a view from above of the embodiment in FIG. 10, with the handle stowed.
Figure 12:
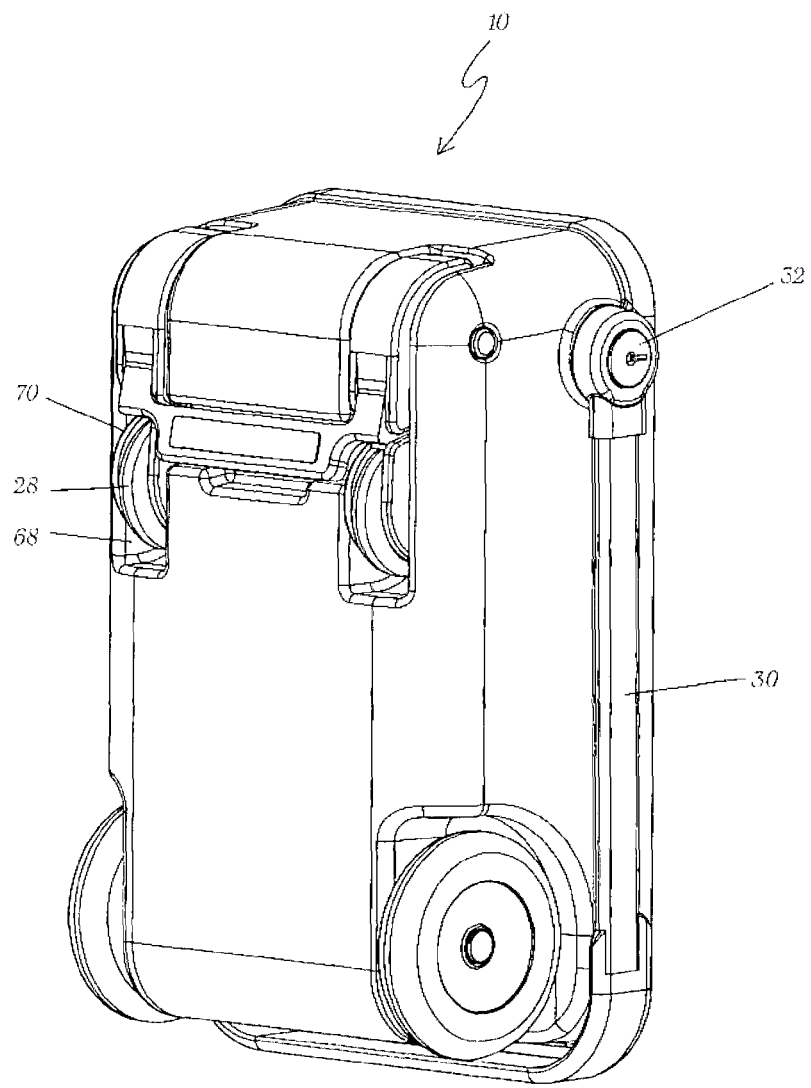
FIG. 12 is a view of the FIG. 10 embodiment from below, handle and rear wheels stowed.

As an alternative to using notched sections 66, pivot joints 60 and wheel assembles 29 may be locked in place via a mechanism associated with handle 30. This option is illustrated in FIGS. 10 to 12.

Figure 10:
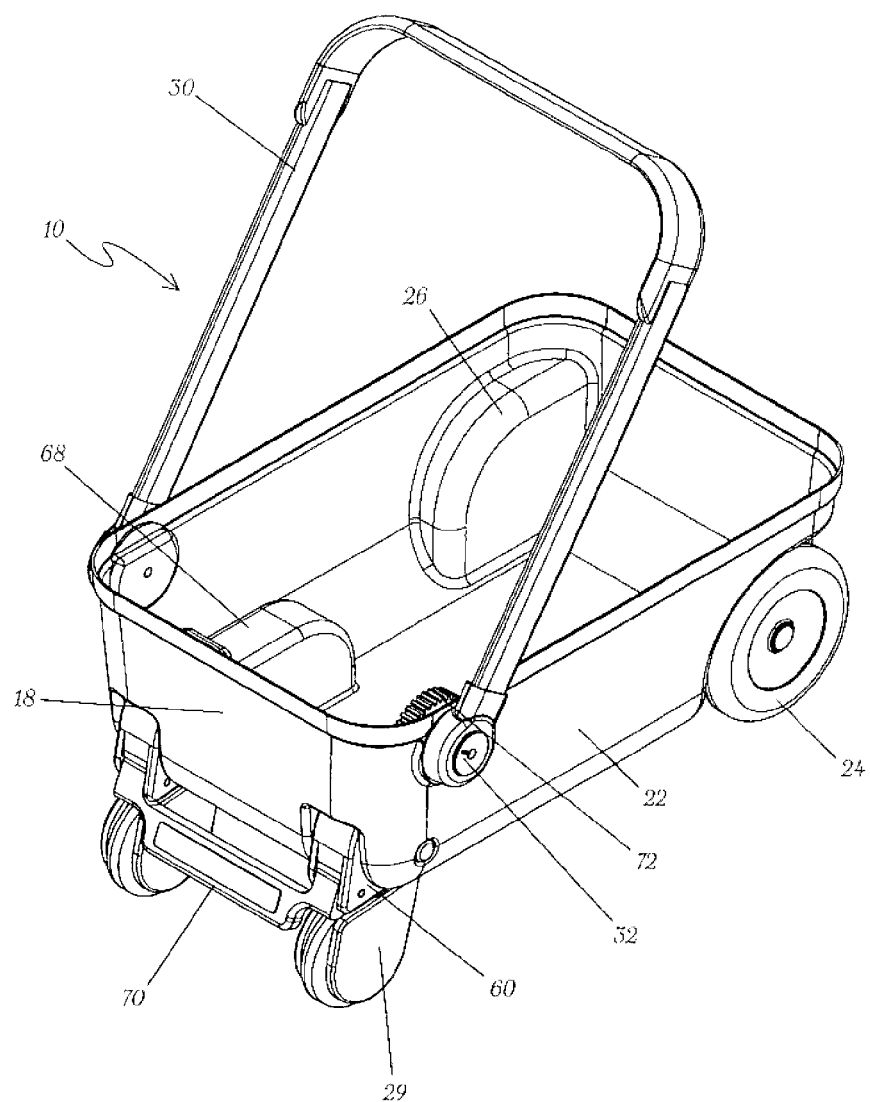
FIG. 10 shows an embodiment of part of the luggage apparatus of the invention, with an intermediate lid removed.

FIG. 10 shows the shape of recesses 26 and 68 within the body of luggage apparatus 10. Brake 70 is shown connecting wheel assemblies 29 and acts as a link between wheel assemblies 29 to ensure that both wheels 28 open and retract as one. Brake 70 operates in known manner and is able to lock wheel assemblies 29 so that travel is restricted to forward and backward, or to arrest movement of luggage apparatus 10 entirely.

Preferably, brake 70 is designed to connect to an upper part of wheel assembly 29 and pivots on an axis at the point of connection. In a first, closed position, a surface of brake 70 pushed against wheels 28, preventing them from turning. In a second, open position, wheels 28 are able to rotate freely, but only in alignment with the longer dimension of luggage apparatus 10.

Notched gear 72 is connected to pivot 32 of handle 30. As shown in FIG. 11, notched gear 72 engages gear 74, so that when handle 30 is rotated about pivot 32, gear 72 rotates and engages gear 74, causing wheel assemblies 29 to open from a closed, resting position in recesses 68. Preferably, when handle 30 is rotated clockwise, wheel assembles 29 open counter-clockwise to open, and when handle 30 is rotated counter-clockwise, wheel assemblies 29 close clockwise to retract into recesses 68.

The distance of rotation of wheel assemblies 29 is limited optimally so that, when fully open, wheel assemblies 29 align level with the ground for free castor rotation.

The notches on gear 74 can provide selected positions for handle 30. Release of a selected position may be activated using buttons 58 on handle 30 (refer FIG. 2), in known manner.

It will be appreciated by those skilled in the art that many modifications and variations may be made to the embodiments described herein without departing from the spirit or scope of the invention.

INDUSTRIAL APPLICABILITY

The luggage apparatus of the invention provides an efficient and versatile system for transporting children and luggage, especially applicable to airports and flights. The luggage apparatus can be configured to carry either an infant or a child on a stable wheeled platform, facing away from the person pushing the apparatus or facing the person. The child seat of the luggage apparatus may be reclined to cater for infants.

Even when used to transport a child or infant, the luggage apparatus of the invention can be configured to have substantial storage space for travel needs, while qualifying for use as cabin baggage with the majority of airlines.

The invention claimed is:

1. A luggage apparatus capable of being used in a normal mode and alternately in a child carrying mode, the luggage apparatus including:

a top, a bottom, a front, a rear and opposing sides, the dimension between the front and the rear being longer than the dimension between the opposing sides;

a first wheel means located in the vicinity of the front and adapted to enable wheeling of the luggage apparatus in the normal mode;

a second wheel means located in the vicinity of the rear and, in conjunction with the first wheel means, adapted to enable wheeling of the luggage apparatus in the child carrying mode;

a first compartment adapted for storage;

a child seat comprising a backrest and a seating portion, wherein the child seat is foldable within the luggage apparatus in the normal mode and unfoldable in the child carrying mode where the seating portion is positioned at or above the top of the luggage apparatus and the child seat is adapted to support and carry a child;

a frame attaching the child seat to the luggage apparatus, the frame being foldable at pivot points to fold within the luggage apparatus in the normal mode and to unfold in the child carrying mode to support the child seat, wherein the seating portion of the child seat moves relative to the luggage apparatus when the frame is moved between the normal mode and the child carrying mode; and a fixed or movable panel separating the first compartment adapted for storage from the frame and the child seat;

wherein, in the child carrying mode, the longer dimension is substantially parallel to the ground supporting the luggage apparatus and the unfolded child seat is positioned so that the centre of gravity of the child seat and any child thereon is substantially between the front and the rear.

2. The luggage apparatus of claim 1, wherein the seat is adjustable between a reclined position for use with an infant and a less reclined position for use with an older child.

3. The luggage apparatus of claim 2, wherein the seat includes a backrest supported by a frame and wherein adjustment of a recline angle of the backrest includes adjusting the angle of the backrest relative to the top of the luggage apparatus.

4. The luggage apparatus of claim 3, wherein, in the reclined position, the backrest is angled at 40 degrees or less to the ground.

5. The luggage apparatus according to claim 3, wherein adjustment of the recline angle of the backrest comprises adjustment of the frame, relative to the top of the luggage apparatus.

6. The luggage apparatus of claim 3, wherein a second compartment is located close to the top of the luggage apparatus, the second compartment having a closure which forms the top of the luggage apparatus in the normal mode.

7. The luggage apparatus of claim 6, wherein the first compartment has a fixed or movable panel separating the second compartment from the first compartment.

8. The luggage apparatus of claim 6, wherein the foldable child seat is contained in the second compartment when the luggage apparatus is in the normal mode.

9. The luggage apparatus of claim 6, wherein the closure is engaged with the frame.

10. The luggage apparatus of claim 9, the frame and closure including reciprocal protrusions and cavities engaged with one another.

11. The luggage apparatus of claim 3, wherein the foldable child seat has a seating portion, and the backrest includes a lower backrest portion and an upper backrest portion.

12. The luggage apparatus of claim 11, wherein the seating portion, the lower backrest portion and the upper backrest portion are supported by the frame.

13. The luggage apparatus of claim 12, wherein the upper backrest portion is extendable by use of telescoping elements in the frame.

14. The luggage apparatus of claim 1, wherein the frame includes a support for adjustment of a recline angle of the backrest.

15. The luggage apparatus of claim 1, which includes an optionally extendible handle.

16. The luggage apparatus of claim 15 wherein the child seat is not supported by or attached to the handle.

17. The luggage apparatus of claim 15, the handle being adjustable without interfering with child seat recline angle.

18. The luggage apparatus of claim 15, wherein the handle is configured for use in different positions to enable the handle to be pushed from the front or rear of the luggage apparatus.

19. The luggage apparatus of claim 1, wherein the foldable child seat is formed of two or more parts adapted to be folded relatively to each other.

20. The luggage apparatus of claim 1, wherein the child seat is oriented so, in the child carrying mode, that the longer dimension of a child seated in the child seat is parallel to the longer dimension of the luggage apparatus.

* * * * *